United States Patent
Aoki et al.

(10) Patent No.: US 6,819,851 B2
(45) Date of Patent: Nov. 16, 2004

(54) OPTICAL WAVEGUIDE DEVICE AND A TRAVELLING-WAVE OPTICAL MODULATOR

(75) Inventors: Kenji Aoki, Nagoya (JP); Jungo Kondo, Nagoya (JP); Atsuo Kondo, Nagoya (JP); Osamu Mitomi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 118 days.

(21) Appl. No.: 10/108,250

(22) Filed: Mar. 27, 2002

(65) Prior Publication Data

US 2002/0159738 A1 Oct. 31, 2002

(30) Foreign Application Priority Data

Mar. 30, 2001 (JP) .................................. P2001-101729
Jan. 24, 2002 (JP) .................................. P2002-015167

(51) Int. Cl.[7] .................. G02F 1/035; G02F 1/295; G02B 6/10
(52) U.S. Cl. .................. 385/129; 385/2; 385/8; 385/40
(58) Field of Search .................. 385/2, 8, 39–40, 385/129–132; 359/240, 245

(56) References Cited

U.S. PATENT DOCUMENTS 6,219,469 B1   4/2001  Minakata et al.

6,571,026 B2 * 5/2003 Kondo et al. ................. 385/2
6,748,125 B2 * 6/2004 Deliwala ....................... 385/2

FOREIGN PATENT DOCUMENTS

| JP | 06051254 A | * | 2/1994 | .......... G02F/1/035 |
| JP | 06289344 | | 10/1994 | |
| JP | 06289347 | | 10/1994 | |
| JP | 133159/1998 | | 5/1998 | |

OTHER PUBLICATIONS

Yoneyama et al., "Velocity–Matched LiNbO3 Waveguide Optical Modulator Using Inverted Slot Line", IEEE Microwave and Guided Wave Letters, vol. 1, No. 8, Aug. 1991.*

* cited by examiner

*Primary Examiner*—Akm Enayet Ullah
*Assistant Examiner*—Omar Rojas
(74) *Attorney, Agent, or Firm*—Burr & Brown

(57) ABSTRACT

An optical waveguide device has an optical waveguide substrate and a supporting substrate. The optical waveguide substrate has a main body made of an electro-optic material and having a first main face and a second main face, an optical waveguide formed in or on the main body and an electrode formed on the side of the first main face of the main body. The supporting substrate is joined with the second main face of the main body. A low dielectric portion with a dielectric constant lower than that of the electro-optic material is formed in the supporting substrate.

28 Claims, 10 Drawing Sheets

(a)

(b)

OPTICAL WAVEGUIDE DEVICE AND A TRAVELLING-WAVE OPTICAL MODULATOR

This application claims the benefit of Japanese Application P2001-101,729, filed Mar. 30, 2001, and Japanese Application P2002-015,167, filed Jan. 24, 2002, the entireties of which are incorporated herein by reference.

BACKGROUND OF THE INVENTION

1. Field of the Invention

The present invention relates to optical waveguide devices and travelling-wave optical modulators utilizing the same.

2. Related Art Statement

A traveling-wave optical modulator using lithium niobate (LiNbO$_3$), lithium tantalate (LiTaO$_3$) or gallium-arsenide (GaAs) for the optical waveguide has excellent properties and may realize a broadband modulation at a high efficiency. Lithium niobate and lithium tantalate are excellent ferroelectric materials having large electro-optic coefficients and can control light within a short optical path. Factors suppressing the modulation frequency of the traveling-wave optical modulator include velocity mismatch, dispersion, electrode conductor loss and dielectric loss.

The concept of velocity mismatch will now be further explained. In a traveling-wave optical modulator, the velocity of the light propagating through the optical waveguide largely differs from that of the signal microwave propagating through the electrode. Assume that the light and the modulation wave propagating through the crystal have different velocity Vo and Vm, respectively. For example, calculation was made for an LiNbO$_3$ optical modulator having planar type electrodes. The effective refractive index of LiNbO$_3$ single crystal is 2.15, and the velocity of the light propagating through the optical waveguide is inversely proportional to the refractive index. On the other hand, the effective index for modulating wave is given by a square root of the dielectric constant near a conductor propagating the wave. LiNbO$_3$ is a uniaxial crystal, and the dielectric constant in the Z-axis direction is 28 and those in the X-axis and Y-axis directions are 43. Therefore, even if an influence of air having a dielectric constant of 1, the effective index microwave in the LiNbO$_3$ optical modulator having a conventional structure is about 4, which is about 1.9 times 2.15. Thus, the velocity of the light wave is about 1.9 times as much as that of the modulating microwave.

The upper limit of bandwidth "fm" of the optical modulator or the modulating velocity is inversely proportional to a difference in velocity between the light wave and the modulating wave. That is, fm=1/(Vo−Vm). Therefore, assuming that the power loss by electrode is zero, the upper limit of bandwidth "fm" x electrode length "1"=9.2 GHz.cm. Actually, it has been reported that in an optical modulator having an electrode length "1"=2.5 mm, fm=40 GHz. The effect due to the upper limit of modulation speed becomes more substantial as the electrodes become longer. Therefore, an optical modulator having a broadband modulation and low driving voltage has been earnestly demanded.

The inventors have considered the following idea. That is, the velocity matching between signal microwave and light wave may be realized by applying a thin plate with a thickness of, for example, 10 μm for an optical waveguide substrate. It is, however, difficult to obtain a plate with such a small and uniform thickness by grinding. The resulting plate has a low strength and may easily be warped so that it may be useless.

The assignee filed a Japanese patent laid-open number 133, 159/1998 (U.S. Pat. No. 6,219,469), and disclosed a travelling wave optical modulator for giving the solution. The modulator has an optical waveguide substrate having a thinner portion with a thickness of not more than 10 μm where the optical waveguide is formed. It is thereby possible to realize high-speed modulation without forming a buffer layer made of silicon dioxide, and to advantageously reduce the product "Vπ·L" of a driving voltage Vπ and a length of an electrode "L".

SUMMARY OF THE INVENTION

The inventors have studied the whole process for manufacturing a travelling wave optical modulator. They have tried to form a recess on the surface of an optical waveguide substrate by machining, as described in the Japanese Patent 133, 159/1998, to form a thinner portion with a thickness of, for example, not more than 10 μm. They found the following problems. FIG. 10 schematically shows such substrate 16. A deep recess 17 is formed by, for example laser beam working or grinding, from the back face 16b of the substrate 16. The substrate 16 has a thickness of, for example, 0.3 mm and the thinner portion 16c has a thickness of, for example, 10 μm. A thicker portion 16a remains after the working in the substrate 16 to preserve the mechanical strength. 16d is a worked surface.

In an actual working process, however, it may be difficult to form the recess with an ideal shape shown in FIG. 10. For example, the recess is formed by laser beam working using a lens. As the recess 17 is deeper, the focus of the lens moves so that the worked surface 16d is curved or rounded. It is therefore difficult to maintain the thickness of the thinner portion 16c at a specific value. The thickness of the central part of the thinner portion 16c tends to be considerably smaller than that of the peripheral parts of the thinner portion. As a result, when the working is performed so that the thickness of the thinner portion 16c is maintained not larger than a specified value, for example not larger than 10 μm, over a sufficiently wide area, the thickness of the central part of the thinner portion 16c becomes considerably smaller than 10 μm. In other words, if the thickness of the peripheral part of the thinner portion 16c is adjusted to 10 μm, the central part of the thinner portion 16c is made considerably smaller than 10 μm. Such thin central part with a thickness of smaller than 10 μm may easily be broken as 16e. When the substrate 16 is worked using a grinding stone, the above problems may not be avoided.

An object of the invention is to provide an optical waveguide device having an optical waveguide substrate having a mechanical strength sufficient for handling, being effective for reducing off-specification products due to warping, cracks and fracture in the substrate, and effective for improving the propagating velocity of signal wave applied onto its electrode.

Another object of the invention is to apply the above optical waveguide device to a travelling-wave optical modulator to improve the velocity matching of signal wave applied onto its electrode and light wave propagating through the optical waveguide.

The invention provides an optical waveguide device comprising an optical waveguide substrate and a supporting substrate supporting the optical waveguide substrate wherein the optical waveguide substrate comprises a main body made of an electro-optic material and having a first main face and a second main face, an optical waveguide formed in or on the main body and an electrode formed on the side of the first main face of the main body. The supporting substrate is joined with the second main face of the main body, and a low dielectric portion with a dielectric constant lower than that of the electro-optic material is formed in the supporting substrate.

The invention further provides a travelling-wave optical modulator having the device, wherein a voltage for modulating the light propagating through the optical waveguide is applied by means of the electrode.

The inventors studied the problems described above, and have reached the conclusion that the problems might not be totally avoided in a process of forming the thicker portion 16a for improving the strength and an space 17 for improving the propagating velocity of microwave signal in the substrate 16, as shown in FIG. 10. The inventors have tried to ensure a sufficient strength of a device by providing a separate supporting substrate. That is, the supporting substrate is joined with an optical waveguide substrate to provide a mechanical strength sufficient for handling the device. As a result, it is not necessary to provide the thicker portion in the optical waveguide substrate for assuring the mechanical strength sufficient for handling, so that the total thickness of the optical waveguide substrate may be considerably reduced. The inventors also have reached the idea that a recess or space is formed in the supporting substrate to utilize the recess or space for improving the propagating velocity of microwave in the electrode.

It is therefore possible to provide a mechanical strength sufficient for handling an optical waveguide device as a whole and to prevent the warping of its optical waveguide substrate at the same time. Moreover, it is possible to reduce off-specification products due to cracks or fractures caused during the working process for forming a thinner portion in the optical waveguide substrate. It is thereby possible to reduce the thickness of the optical waveguide substrate and to improve the propagating velocity of signal wave applied onto the electrode by providing a space in the supporting substrate. Any kinds of low dielectric portions with a relatively low dielectric constants may be used instead of the recess or space.

The invention further provides an optical waveguide device comprising an optical waveguide substrate and a supporting substrate supporting the optical waveguide substrate wherein the optical waveguide substrate comprises a main body made of an electro-optic material and having a first main face and a second main face, an optical waveguide formed in or on the main body and an electrode formed on the side of the first main face of the main body. The device further comprises a joining layer joining the supporting substrate and the second main face of the main body and a low dielectric portion with a dielectric constant lower than that of the electro-optic material. The low dielectric portion is provided inside the joining layer between the main body and the supporting substrate.

The inventors further found that the above effects may be obtained by providing a low dielectric portion inside of the joining layer, instead of providing the low dielectric portion in the supporting substrate.

These and other objects, features and advantages of the invention will be appreciated upon reading the following description of the invention when taken in conjunction with the attached drawings, with the understanding that some modifications, variations and changes of the same could be easily made by the skilled person in the art.

DETAILED DESCRIPTION OF THE INVENTION

Figure 1:
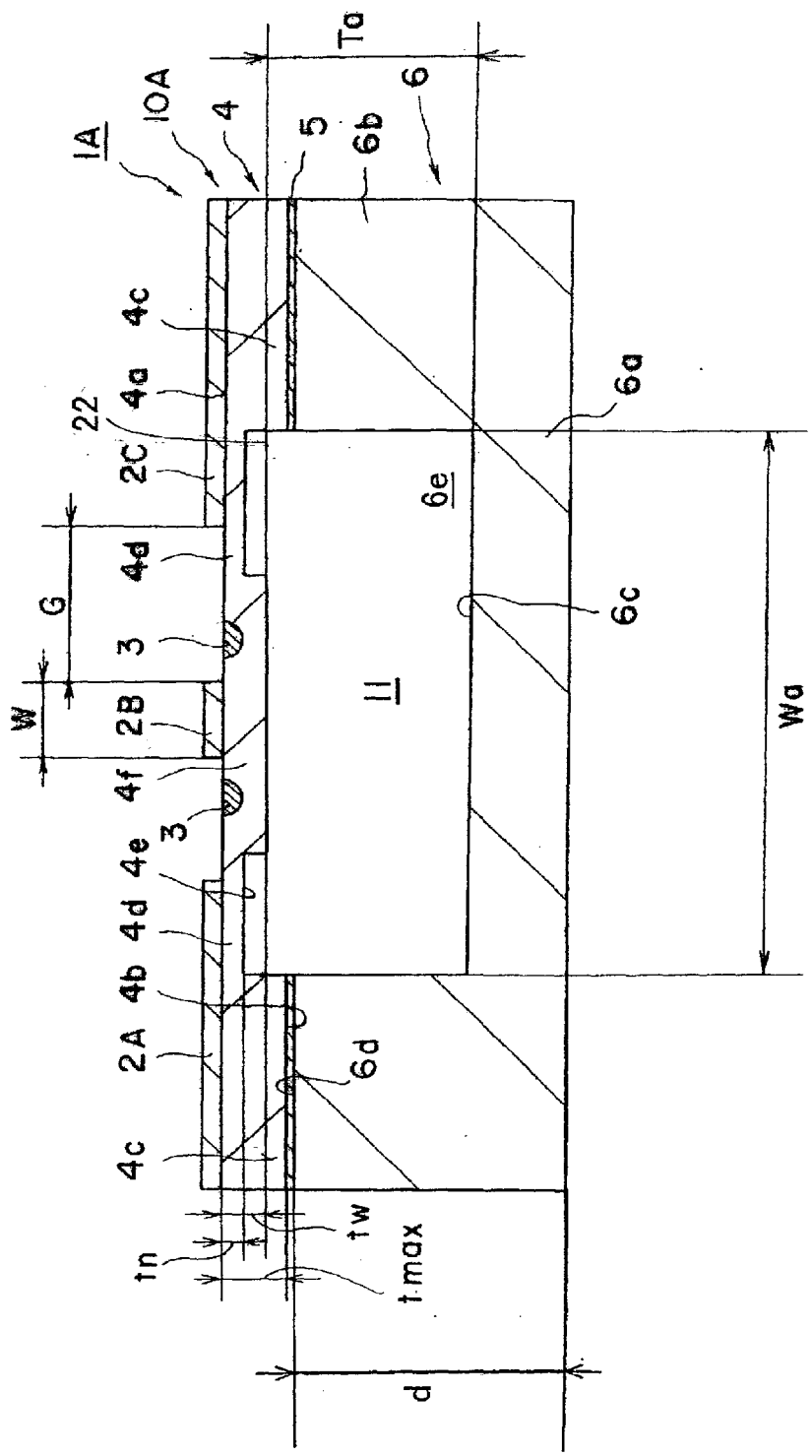
FIG. 1 is a cross sectional view showing a travelling-wave optical modulator 1A according to one embodiment of the invention.

The invention will be further described referring to the attached drawings. FIG. 1 is a cross sectional view schematically showing an optical modulator 1A according to one embodiment of the invention. FIG. 1 shows the cross section substantially perpendicular to a direction of light propagation in this travelling waveguide optical modulator.

The optical modulator 1A has an optical waveguide substrate 10A and a supporting substrate 6. Both the main body 4 and substrate 6 are plate-shaped. Predetermined electrodes 2A, 2B and 2C are formed on a first main face 4a of the main body 4. Although it is applied as a so called coplanar waveguide type electrode (CPW electrode) configuration in this example, the configuration of electrodes are not particularly limited. In this example, a pair of optical waveguides 3 are formed between the neighboring electrodes, so that a signal voltage may be applied onto each optical waveguide 3 in a direction substantially parallel with the main face 4a. The optical waveguide 3 is of Mach-Zehnder type structure, which is well known and is not particularly illustrated. A recess 4e is formed on the side of the second main face 4b of the main body 4. Two second thinner portions 4d and one first thinner portion 4f face the recess 4e. The thinner portion 4f is formed between the first thinner portions 4d. A base portion 4c with a thickness larger than that of the thinner portion 4f is provided outside of the thinner portions 4d.

A recess 6e is formed in the supporting substrate 6. The substrate 6 has a plate-shaped portion 6a on the side of the other main face and side wall portions 6b protruding from the plate-shaped portion 6a. One main face 6d of the substrate 6 is joined with the other main face 4b of the main body 4 through a joining layer 5. 6c is an exposed face of the substrate 6 to a space 11. In this example, a recess 22 is formed on the side of the back face (the second main face) 4b of the substrate. In this example, the space 22 and 11 together form a larger space.

The strength of the device may be preserved by means of the supporting substrate 6 with a relatively large thickness, providing a strength sufficient for handling to the device. The warping of the main body 4 may also be prevented. The thickness of the main body 4 may be also reduced and the recess 6e or space 11 formed in the substrate 6 may be deeper, thus improving the propagation velocity of microwave in the electrode. In other words, as the thickness "tw" of the region 4f where the optical waveguide is formed is small (thin), the propagation velocity of the microwave may be higher. Further, as a total (Ta) of the depths of the spaces 11 and 22 is larger, the propagation velocity of the microwave may be higher.

It is noted that the shape of the exposed face 6c of the supporting substrate 6 to the space 11 has little influence or effects on the light propagating through the optical waveguide and the microwave signal propagating through the electrode. In other words, the exposed face 6c is too distant from the optical waveguide 3 or electrodes 2A, 2B and 2C to put a substantial influence upon them. The light modulation may be scarcely affected, even when the exposed portion 6c has a curved shape or the thickness of the plate shaped portion 6a is uneven after forming the space 11 in the thick supporting substrate.

Figure 10:
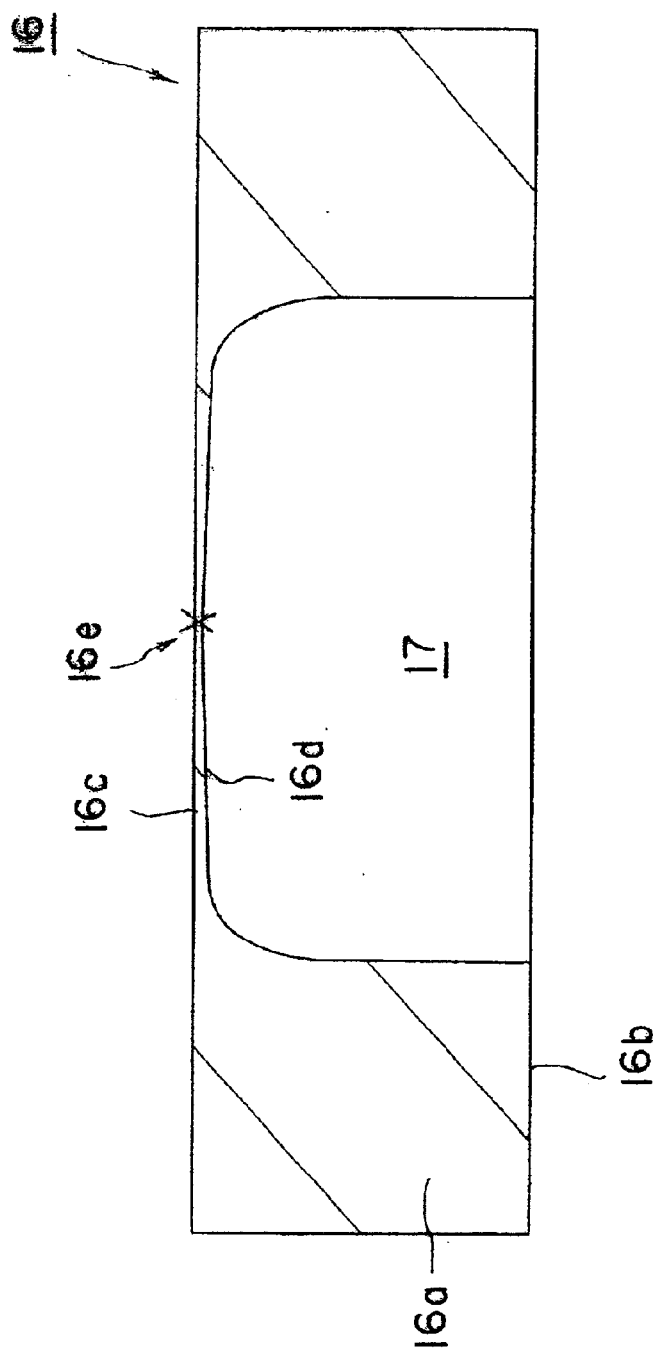
FIG. 10 is a diagram schematically showing an optical modulator, for explaining the problems encountered.

On the other hand, as shown in FIG. 10, a recess 17 is formed on the side of the second main face 16b of the optical waveguide substrate 16. In this device, when the recess has an curved inner wall face or the thickness of the thinner portion 16d is uneven, the light propagating through the optical waveguide or microwave signal propagating through the electrode may be substantially affected.

Figure 2:
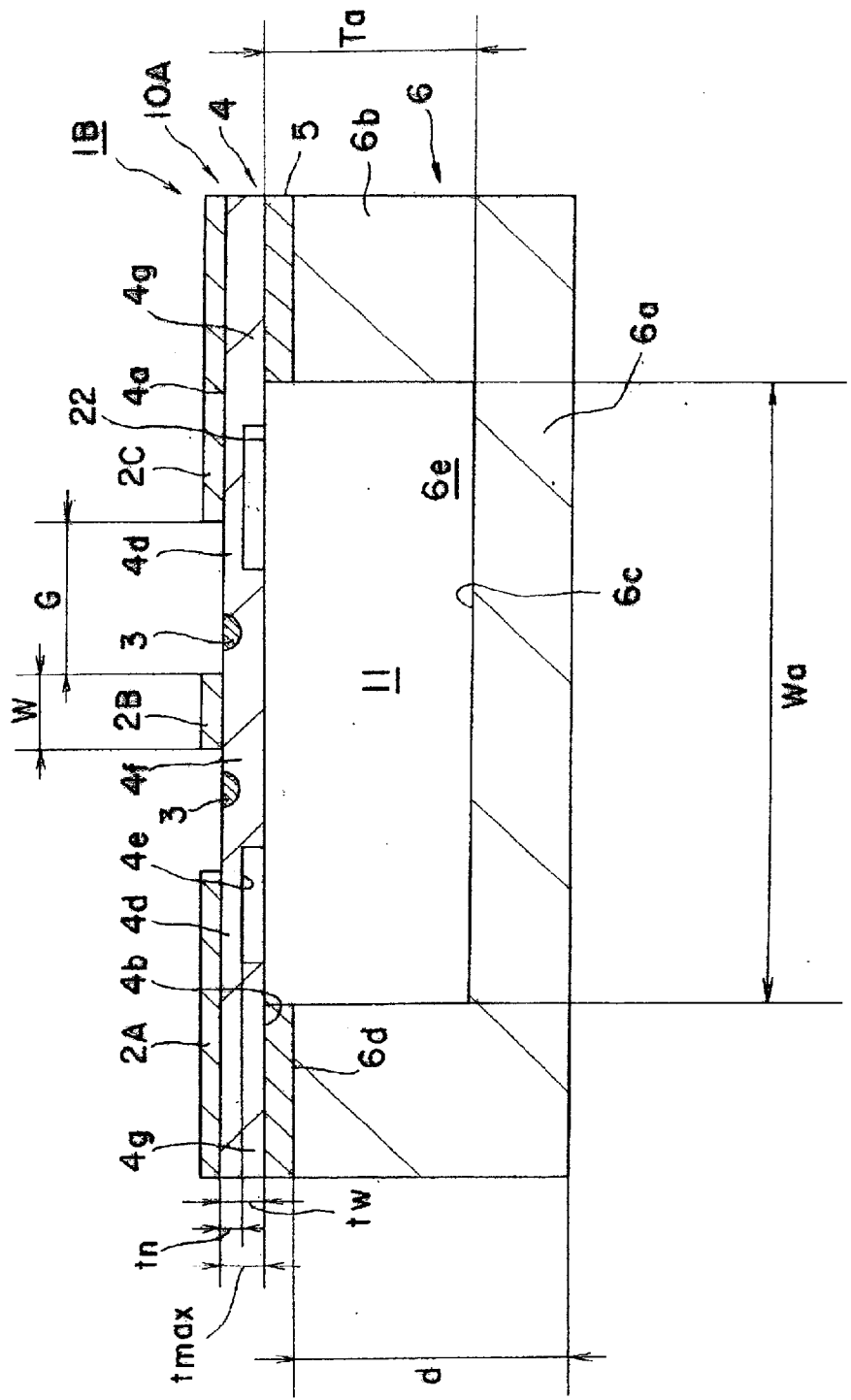
FIG. 2 is a cross sectional view showing a travelling-wave optical modulator 1B according to another embodiment of the invention.

An optical modulator 1B, shown in FIG. 2, has two second thinner portions 4d and one first thinner portion 4f both facing a recess 4e. The thinner portion 4f is between a pair of the thinner portions 4d. Base portions 4g with a thickness substantially the same as that of the portion 4f are provided outside of the thinner portions 4d.

Figure 3:
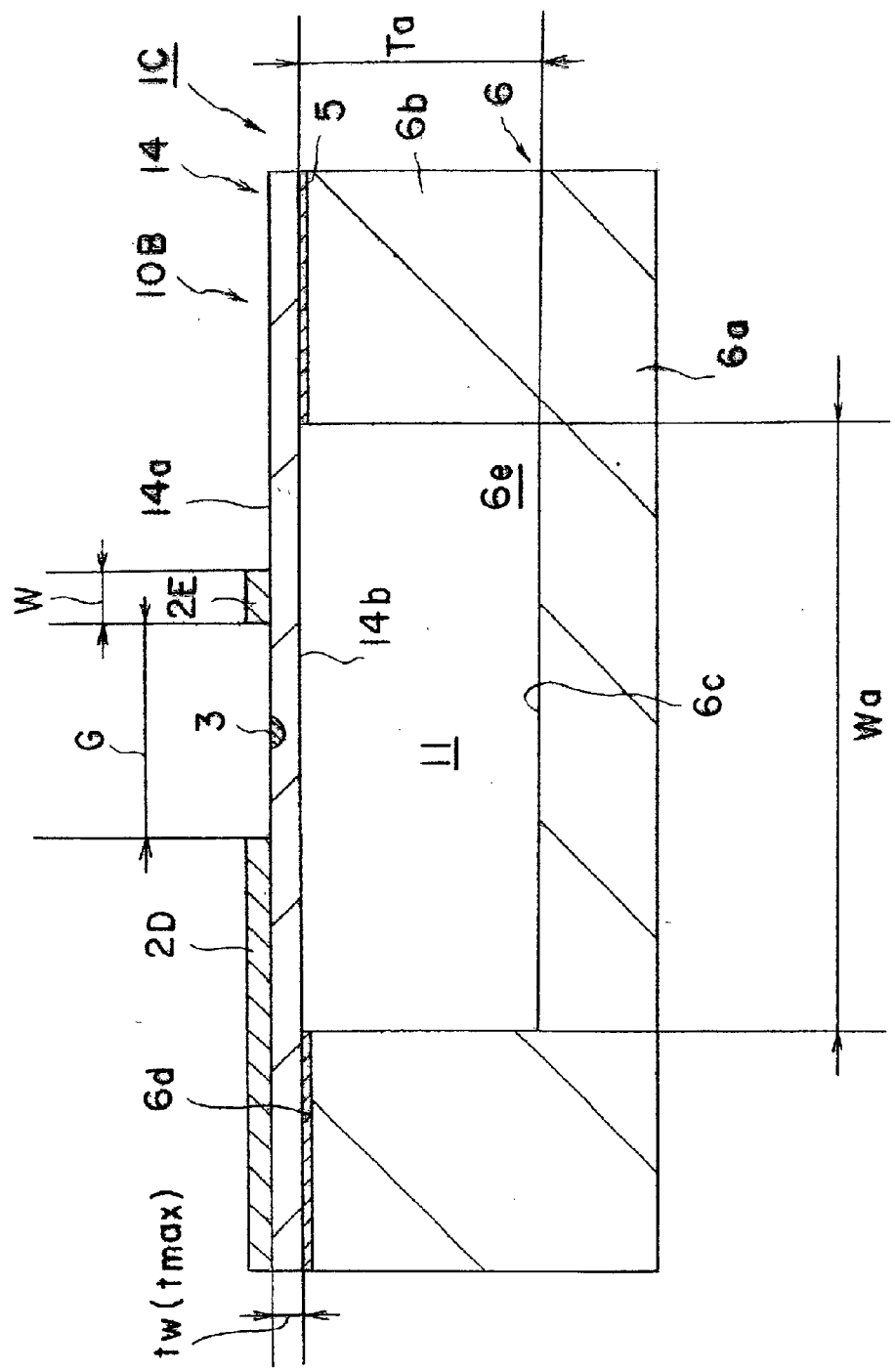
FIG. 3 is a cross sectional view showing a travelling-wave optical modulator 1C according to still another embodiment of the invention.

A travelling-wave optical modulator 1C, shown in FIG. 3, has an optical waveguide substrate 10B and supporting substrate 6. Predetermined electrodes 2D and 2E are formed on a first main face 14a of a main body 14. In this example, it is applied as a so called asymmetric coplanar strip line electrode (A-CPS electrode) pattern. Also in the example, an optical waveguide 3 is formed between the adjacent electrodes, so that a signal voltage may be applied on the optical waveguide in a direction substantially parallel with the main face. The second main face 14b of the substrate 14 is also flat.

A recess 6e is formed in the supporting substrate 6. The substrate 6 has a plate-shaped portion 6a on the side of the other main face and side wall portions 6b protruding from the plate-shaped portion 6a. One main face 6d of the substrate 6 is joined with the second main face 14b of the main body 14 through the joining layer 5. 6c is an exposed face of the substrate 6 to the space 11.

Figure 4:
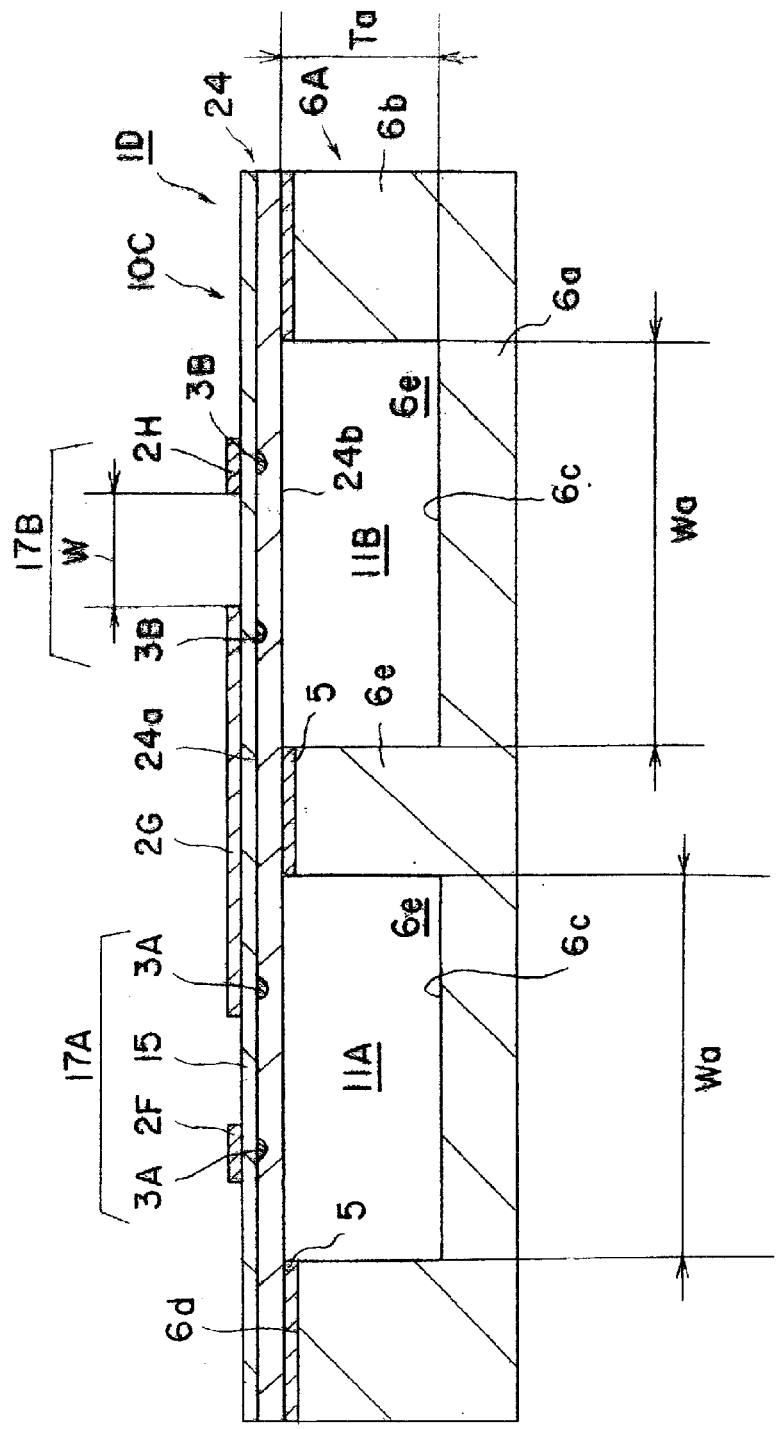
FIG. 4 is a cross sectional view showing a travelling-wave optical modulator 1D according to still another embodiment of the invention.

The invention may be applied to travelling wave optical modulators of so called independent modulation type. FIG. 4 shows an optical modulator 1D according to this embodiment. The modulator 1D has an optical waveguide substrate 10C and a supporting substrate 6A. Predetermined electrodes 2F, 2G and 2H are formed on a first main face 24a of a main body 24 through a buffer layer 15. In this example, optical waveguides 3A and 3B are formed directly under the electrodes, respectively, so that a signal electrical field may be applied on each optical waveguide in a direction substantially perpendicular to the main face 24a of the substrate.

A pair of optical waveguides 3A belong to first modulating unit 17A and a pair of optical waveguides 3B belong to second modulating unit 17B. The optical waveguides 3A and 3B are modulated separately and independently. The second main face 24b of the substrate 24 is substantially flat.

For example two recesses 6e are formed in the supporting substrate 6A. The substrate 6A has a plate-shaped portion 6a on the side of the other main face and for example three side wall portion 6b and 6e each protruding from the plate-shaped portion 6a. One main face 6d of the substrate 6 is joined with the second main face 24b of the main body 24 through the joining layer 5, so that spaces 11A and 11B are formed. 6c is an exposed face of the substrate 6 to each space.

Figure 5:
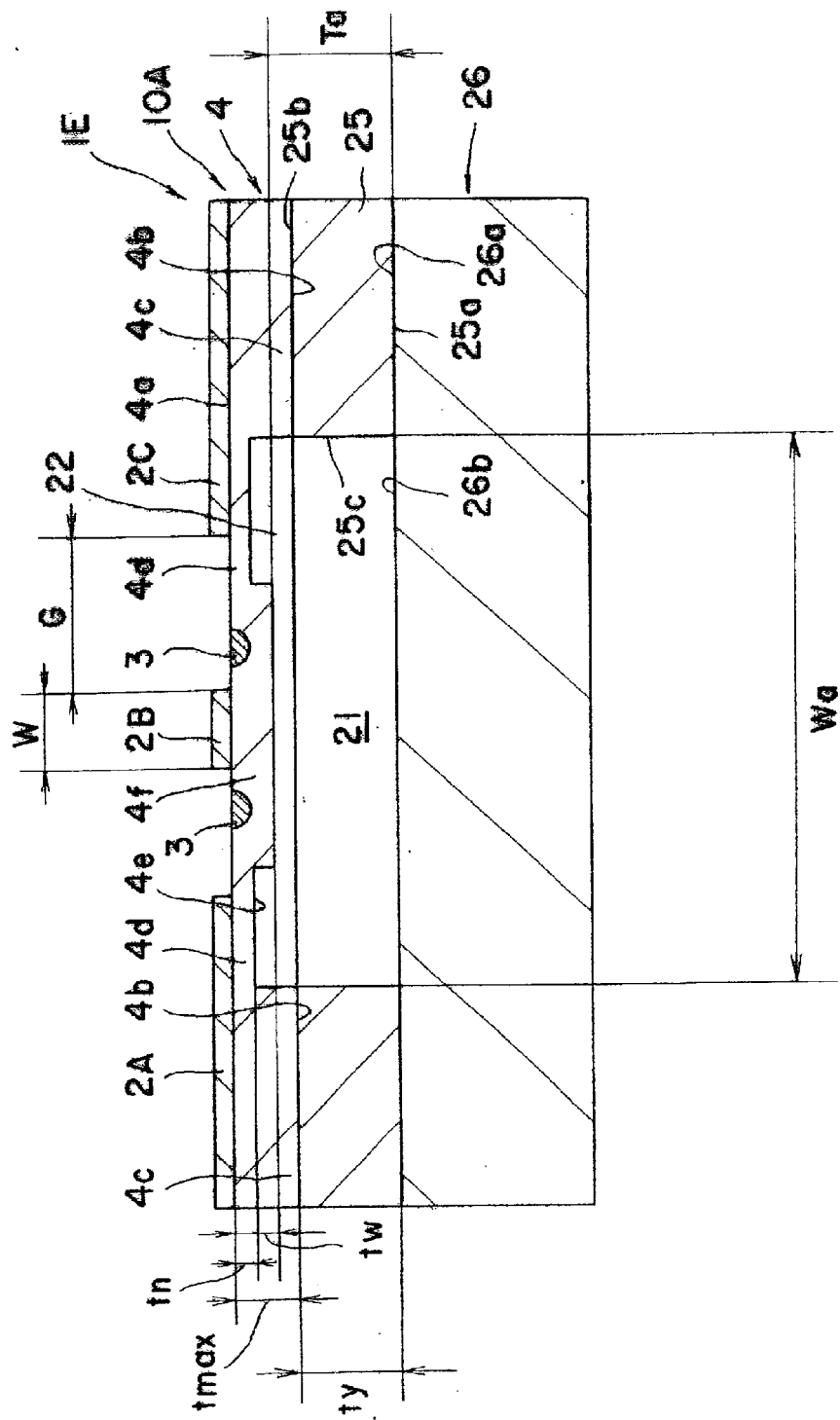
FIG. 5 is a cross sectional view showing a travelling-wave optical modulator 1E according to still another embodiment of the invention.
Figure 6:
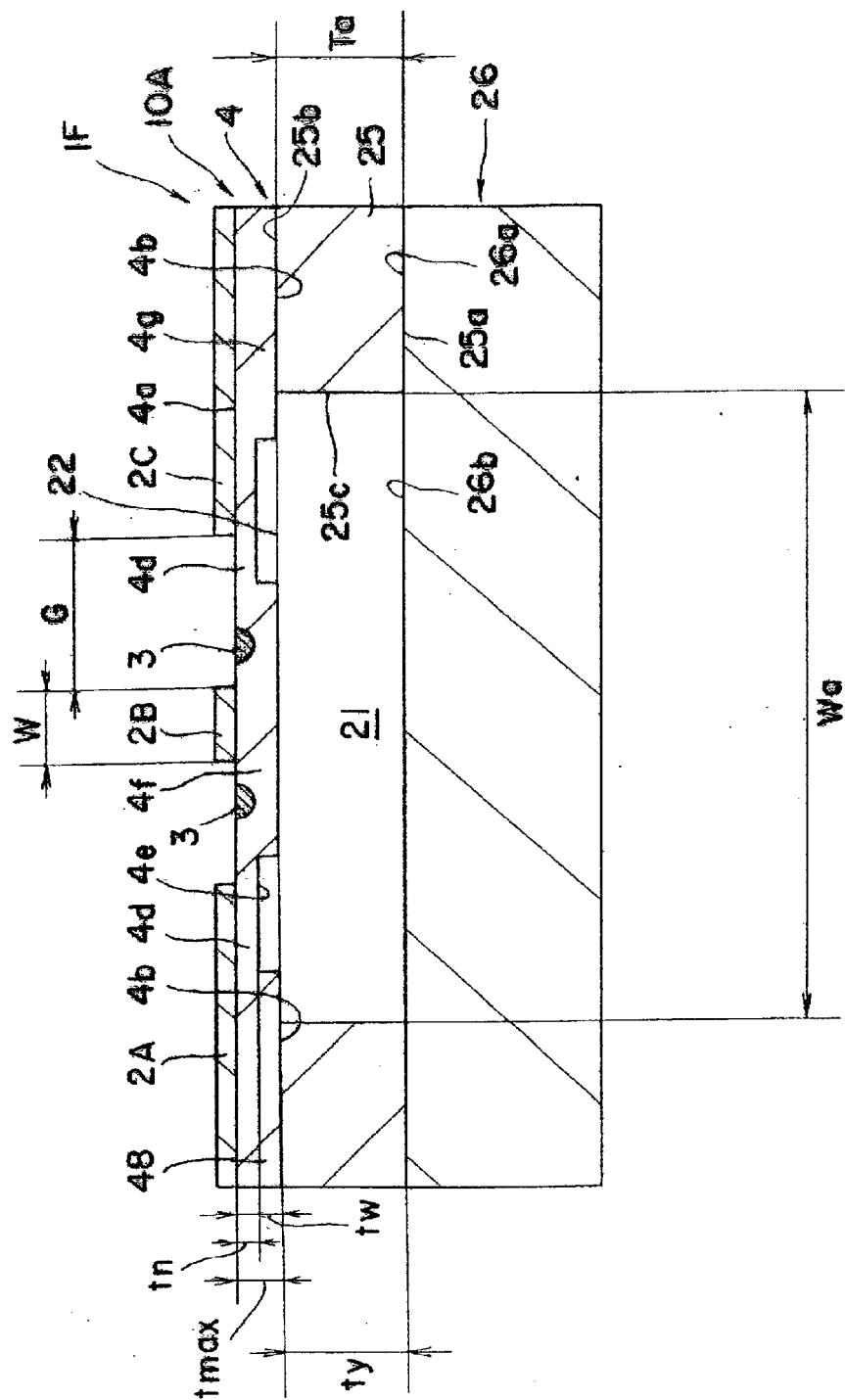
FIG. 6 is a cross sectional view showing a travelling-wave optical modulator 1F according to still another embodiment of the invention.
Figure 7:
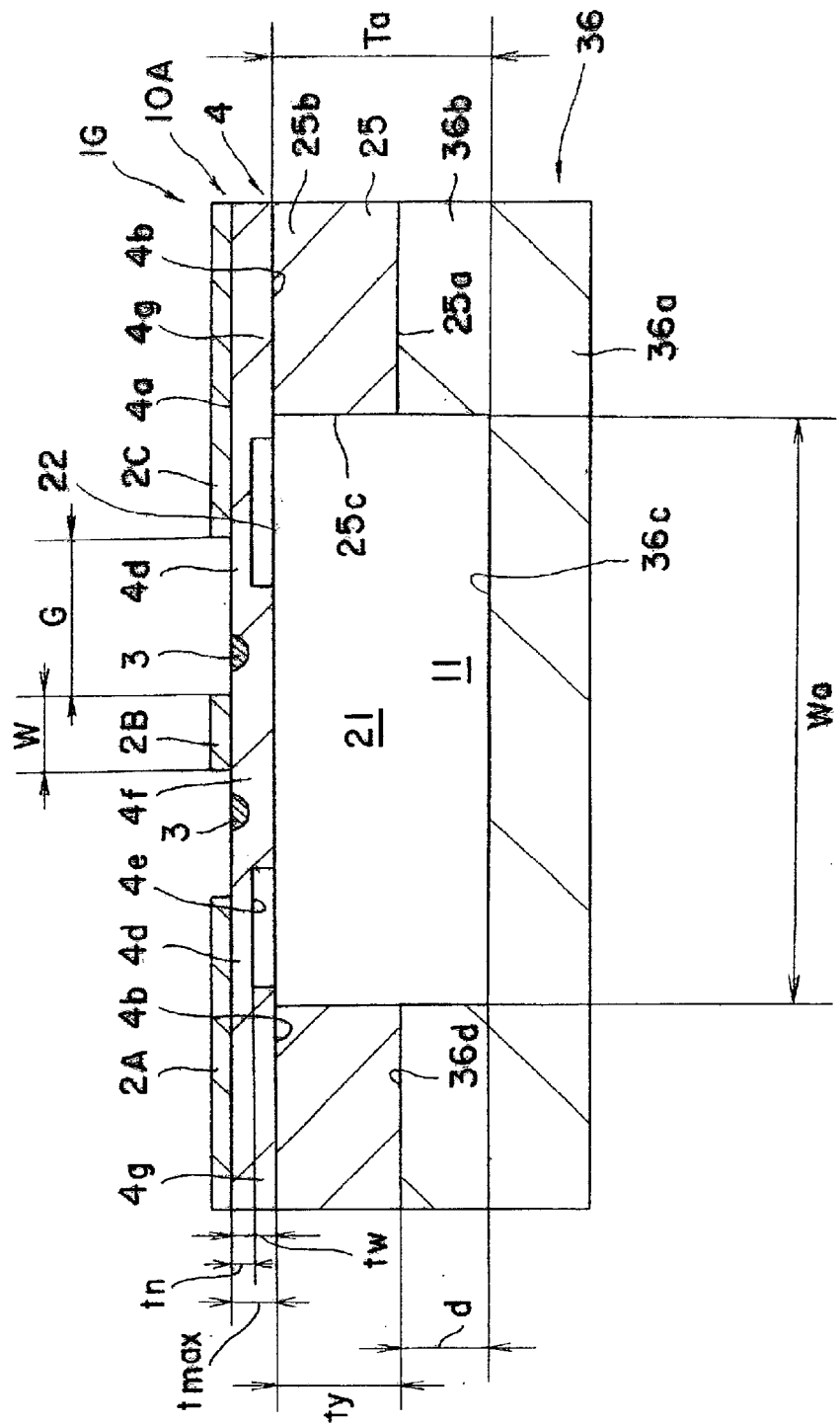
FIG. 7 is a cross sectional view showing a travelling-wave optical modulator 1G according to still another embodiment of the invention.

In the following examples, a low dielectric portion is provided inside of a joining layer. FIGS. 5, 6 and 7 are cross sectional views schematically showing optical waveguide devices 1E, 1F and 1G, respectively. When the devices shown in FIGS. 5, 6 and 7 have the same components already shown in FIG. 1, such components are specified using the same reference numerals as those in FIG. 1 to avoid repeating the same explanation.

An optical waveguide substrate 10A of a device 1E shown in FIG. 5 is substantially the same as that shown in FIG. 1, except that a supporting substrate 26 is plate shaped without forming a space or low dielectric portion therein, in the present example. The flat face 26a of the supporting substrate 26 is joined with a joining face 4d of a main body 4 at the joining faces 26a located at both ends of the flat face 26a, through a joining layer 25 having a thickness of "ty". 25a and 25b are joining faces of the joining layer 25. As a result, a space 21 is surrounded and formed by the back face of the main body 4, the flat face 26b of the supporting substrate 26 and joining layer 25. The inner face 25c of the joining layer 25 faces the space 21. The space 21 communicates with recesses 22 formed on the main body.

The distance "Ta" between the back face 4b of the main body 4 and the supporting substrate 26 may be increased by providing the space 21 or another low dielectric portion inside of the joining layer 25, without the necessity of forming a space or another low dielectric portion in the supporting substrate 26. Such configuration is effective for the high speed modulation described above.

An optical modulator shown in FIG. 6 has a pair of second thinner portions 4d and one first thinner portion 4f both facing the recess 4e. The thinner portion 4f is between a pair of the thinner portions 4d. Base portions 4g, with a thickness substantially the same as that of the thinner portion 4f, are provided outside of the respective thinner portions 4d.

In a preferred embodiment, a low dielectric portion may be provided in a supporting substrate and another low dielectric portion may be provided inside of a joining layer at the same time. FIG. 7 shows a device according to this embodiment.

A device 1G of FIG. 7 has an optical waveguide substrate 10A substantially the same as that shown in FIG. 2. In this example, a recess 36c is formed in a supporting substrate 36. The substrate 36 has a plate-shaped portion 36a and side wall portions 36b protruding from the plate-shaped portion 36a. A recess 36c is formed inside of the side wall portions 36b. One main face 36d of the supporting substrate 36 is joined with the joining face 25a of the joining layer 25. The joining face 25b of the joining layer 25 is joined with the back face 4b of the main body 4.

In the present example, a space 11 is formed in the substrate 36, a space 21 is formed inside of the joining layers 25 and recesses 22 are formed on the side of back face 4b of the main body 4. The spaces 11 and 21 and the recesses 22 communicate with each other to form a larger space in the device.

In a preferred embodiment, at least a part of the low dielectric portion provided in the supporting substrate, and/or, at least a part of the dielectric portion provided inside of joining layers is a space as shown in FIGS. 1 to 7. A space filled with only air has a dielectric constant of the air or atmosphere, which is a minimum value practically obtained. It is thus preferred for improving the propagating velocity of a microwave signal.

It is, however, possible to fill a low dielectric material with a dielectric constant lower than that of the electro-optic material in at least a part of the low dielectric portion provided in the supporting substrate, and/or, the low dielectric portion provided inside of the joining layer. It is also possible to improve the propagating velocity of a microwave signal compared with an optical waveguide device having a supporting substrate and an optical waveguide substrate, in which the substrates are contacted with each other without forming the low dielectric portion.

Particularly, the low dielectric material with a dielectric constant lower than that of the electro-optic material may be directly contacted with at least the second main face (back face) of the main body. It is desirable that the thickness of the main body is made smaller for improving the velocity matching. The low dielectric material contacted with the main body is effective for directly supporting the thin main body at its back face (the other main face). In this case, it is possible to fill the whole of the low dielectric portion, such as a recess formed in the supporting substrate, with the low dielectric material without leaving an empty space. Alternatively, the low dielectric portion may be divided into at least two parts. The first part is the low dielectric material filled in the empty space for contacting the material with the second main face of the main body. The second part is an empty space left unfilled with the low dielectric material. Such low dielectric material includes a glass, an adhesive such as epoxy resin or acrylic resin series adhesives, a layer insulator for producing a semiconductor, and polyimide resin.

In a preferred embodiment, the region of the second main face of the optical waveguide substrate where the optical waveguide is formed, faces the low dielectric portion provided in the supporting substrate, and/or, the dielectric material surrounded by the joining layers.

The main body for constituting the optical waveguide substrate is made of an electro-optic material having ferroelectricity and may preferably be made of a single crystal. Such crystal is not particularly limited as far as it is effective for light modulation, and includes lithium niobate, lithium tantalate, lithium niobate-lithium tantalate solid solution, potassium lithium niobate, KTP, GaAs and quartz. Single crystals of lithium niobate, lithium tantalate, lithium niobate-lithium tantalate solid solution and quartz are particularly preferred.

The electrode may be made of a material not particularly limited so long as it has low resistance and excellent impedance properties, including gold, silver, copper or the like.

The material for the supporting substrate may preferably be a material having a dielectric constant lower than that of the electro-optic material, for minimizing the influence of the supporting substrate on the propagating velocity of microwave signal. Such material includes a glass such as quartz glass or the like.

It is possible to prevent the influence of the change of ambient temperature on the light modulation, by reducing a difference between the linear thermal expansion coefficient of the main body and that of the supporting substrate. In this case, the materials for the main body and supporting substrate may be the same or different from each other.

Further, the supporting substrate may be made of a material having a dielectric constant not lower than that of the electro-optic material for the optical waveguide substrate. In this case, the supporting substrate may preferably be made of a single crystal of the same kind as that constituting the main body.

According to the invention, the material, particularly single crystal, constituting the supporting substrate may preferably be of the same kind as a material for the main body, particularly single crystal, for matching the thermal expansion between them. Although it is preferred to apply a ferroelectric material, particularly single crystal, as a material for the supporting substrate for reducing thermal stress, the light wave and microwave propagating in the optical waveguide substrate may be normally affected by the nearby ferroelectric material (that is, supporting substrate). However, according to the invention, it is possible to form a deep space or another low dielectric portion 11 or 11A or 11B. It is thereby easy to create a distance, sufficient for preventing the adverse effects on the light wave and microwave exerted by the supporting substrate, between the optical waveguide or the electrode and the supporting substrate.

In the present embodiment, a material, particularly single crystal, constituting the supporting substrate may be the same kind as a material, particularly single crystal, constituting the main body. This embodiment includes the case that the main formulation (for example, main formulation constituting not less than 80 mol percent of the whole) is common with the supporting substrate and main body. Ingredient or ingredients other than the main formulation may be the same or different from each other.

A buffer layer may be provided between the first main face and the electrode. The buffer layer may be made of any known material such as silicon dioxide, magnesium fluoride, silicon nitride and alumina.

The optical waveguide is formed in or on the main body and may preferably be formed on the side of the first main face of the main body. The optical waveguide may be a ridge type optical waveguide directly formed on the first main face of the main body, or a ridge type optical waveguide formed on another layer on the first main face of the main body. Alternatively, the optical waveguide may be an optical waveguide formed by inner diffusion process such as titanium diffusion process, or an optical waveguide produced by ion exchange process such as proton exchange. The electrode may be on the side of the first main face of the main body as described above. Alternatively, the electrode may be directly formed on the first main face of the main body, or may be formed on the buffer layer on the main face.

In the main body, the polarization axis of the crystal may preferably be substantially parallel with the first main face (surface) of the main body. In this embodiment, it is preferred to be an X-cut or Y-cut lithium niobate, lithium tantalate or lithium niobate-lithium tantalate solid solution. FIGS. 1, 2, 3, 5, 6 and 7 show examples where the main body is of the X-cut or Y-cut.

Alternatively, in another preferred embodiment, the polarization axis of crystal is substantially perpendicular to the first main face (surface) of the substrate. In this embodiment, it is preferred to be a Z plate made of lithium niobate, lithium tantalate or lithium niobate-lithium tantalate solid solution. When a Z plate is used, it is necessary to provide the optical waveguide just under the electrode. Since such configuration tends to increase the propagation loss of light, a buffer layer may preferably be provided between the first main face of the substrate and electrode for reducing the propagation loss.

In a preferred embodiment, the thickness "tw" of the main body is not larger than 50 $\mu$m in the region of the optical waveguide. It is thereby easy to realize the velocity matching of the light wave and microwave. The thickness "tw"ay more preferably be not larger than 20 $\mu$m.

The thickness "tw" of the main body in the region of the optical waveguide may preferably be not smaller than 5 $\mu$m for preventing the fracture or cracks in the main body.

Further in a preferred embodiment, the maximum thickness "tmax" of the main body is not larger than 500 $\mu$m and more preferably than 100 $\mu$m. The reason is as follows. According to the invention, the mechanical strength of the device necessary for proper handling may be mainly given by the supporting substrate, as described above. It is therefore possible to substantially reduce the thickness "tmax" and to preserve the necessary strength of the device at the same time. Further, the thickness "tw" where the optical waveguide is provided may be reduced by reducing the maximum thickness "tmax" of the main body. When the thickness of the main body is constant as a whole, "tmax" is equal to "tw". When a recess is formed in the main body so that "tw" is made smaller than "tmax", as "tmax" is larger, the depth of the recess should be larger so as to sufficiently reduce "tw". As the depth of the recess is larger, however, the problems associated with the working process, described above, may be induced. It is effective to apply the main body with a smaller maximum thickness "tmax" (to apply a thinner substrate) before forming the recess, for reducing the problems associated with the working process.

The maximum thickness "tmax" of the main body may preferably be not larger than 10 $\mu$m for preventing the fracture or cracks during the handling of the main body.

The thickness "Ta" of the low dielectric portion or a total "Ta" of the thicknesses of the low dielectric portions, at the region where the optical waveguide is provided, may preferably be not smaller than 5 $\mu$m and more preferably be not smaller than 30 $\mu$m for improving the velocity matching of the light wave and microwave.

The thickness "d" of the low dielectric portion formed in the supporting substrate and the thickness "ty" of the joining layer may be decided depending on the designed value of "Ta". However, "ty"ay preferably be not smaller than 5 $\mu$m for improving the contribution of the low dielectric portion inside of the joining layer on the high frequency modulation.

The width "Wa" of the low dielectric portion (refer to FIGS. 1, 2 and 3) may preferably be not smaller than 5 $\mu$m and more preferably be not smaller than 100 $\mu$m for improving the velocity matching of the light wave and microwave.

In a preferred embodiment, a recess is formed on the side of the second main face of the optical waveguide substrate, as shown in FIG. 1.

Further in a preferred embodiment, as shown in FIG. 1, the main body has a first thinner portion and a second thinner portion, in which the first thinner portion has a thickness larger than that of the second thinner portion. The optical waveguide is provided within the first thinner portion.

For example, for attaining the velocity matching in a travelling-wave optical modulator operating at an electric signal with a frequency not lower than 10 GHz, it is generally necessary to reduce the thickness of the thinner portion of the main body to about 10 $\mu$m. However, the thinner portion is normally exposed to air whose refractive index is substantially lower than that of the electro-optic material. Consequently, as the thickness of the thinner portion approaches about 10 $\mu$m, the cross section of the light beam propagating through the optical waveguide tends to be elliptic. On the other hand, the cross section of the light beam propagating through outside optical fibers is substantially completely round and the optical fibers are optically connected with the optical waveguide. This creates a substantial mismatch between the distribution of light intensity of the beam propagating through the optical fiber and that of the beam propagating through the optical waveguide in the travelling-wave optical modulator. The optical energy of the incident light is not effectively transmitted, inducing a coupling loss.

In the present embodiment, as shown in FIGS. 1, 2, 5, 6 and 7, the main body 4 has the first thinner portion 4f and the second thinner portion 4d with a thickness smaller than that of the first portion, both facing the recess 4e. The optical waveguide is provided in the first thinner portion 4f so that the above coupling loss may be further reduced.

The thickness "tw" of the first thinner portion 4f may preferably be not larger than 100 $\mu$m and more preferably be not larger than 20 $\mu$m for substantially reducing the effective refractive index "nm" of microwave. The thickness "tw" of the first thinner portion 4f may preferably be not lower than 1 $\mu$m for preserving the roundness of the light beam propagating through the optical waveguide and the mechanical strength at the same time.

The thickness "tn" of the second thinner portion 4d may preferably be smaller than the thickness "tw" of the first thinner portion 4f, more preferably be not larger than 12.5 $\mu$m and most preferably be not larger than 10 $\mu$m, for substantially reducing the effective refractive index "nm" of the microwave.

The optical waveguide substrate and supporting substrate may be joined with a method not particularly limited. In a preferred embodiment, they are joined with an adhesive agent. In this case, the refractive index of the adhesive agent may preferably be lower than that of the electro-optic material constituting the main body. Additionally, the dielectric constant of the adhesive agent may preferably be lower than that of the electro-optic material constituting the main body.

The kind of such adhesive agent is not particularly limited as far as it satisfies the aforementioned conditions. The adhesive includes an epoxy adhesive, a thermal setting type adhesive, an ultraviolet curable adhesive, and a ceramic adhesive having a thermal expansion coefficient near that of the electro-optic material such as lithium niobate, for example "ALON CERAMICS C" (manufactured by Toa Gosei Co., Ltd. and having a thermal expansion coefficient of $13 \times 10^{-6}$/K).

The recess 4e, 6e and 36c may be formed by laser ablation working using excimer laser or dicing.

The device according to the invention may be produced by a method not particularly limited. In a particularly preferred embodiment, an optical waveguide substrate having a small thickness is produced in advance and this substrate is joined with the end face on the side of the recess of a supporting substrate. In this case, a predetermined optical waveguide and electrode are formed on the first main face of a plate shaped bulk having a large thickness for the optical waveguide substrate. The first main face (surface) of the bulk is fixed onto a surface plate using an adhesive. The back face (the second main face) of the bulk is then ground and polished to produce an optical waveguide substrate with a predetermined thickness. The back face (the second main face) of the main body is joined with the supporting substrate with the recess formed therein.

Figure 8:
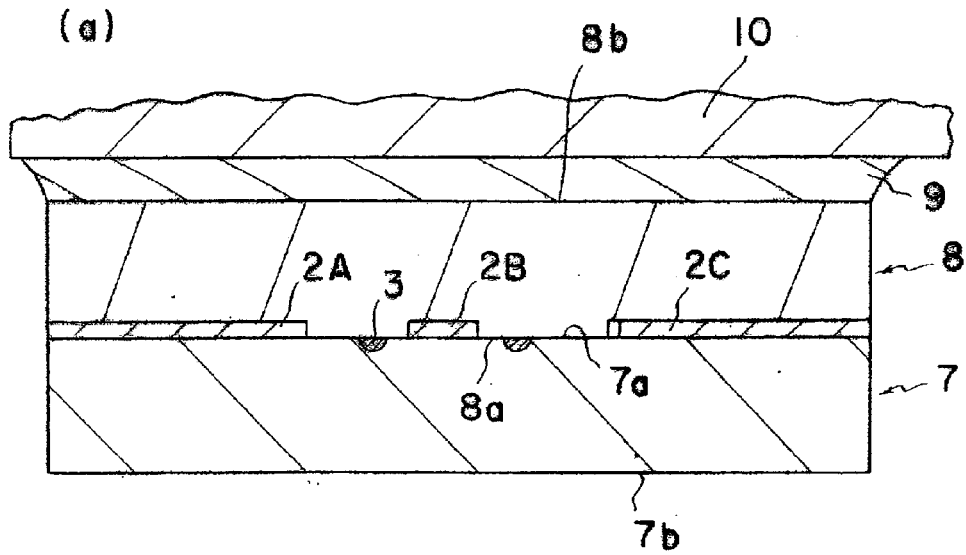
FIG. 8 shows figures for explaining stages of one example for manufacturing a travelling-wave optical modulator of the invention.
Figure 8:
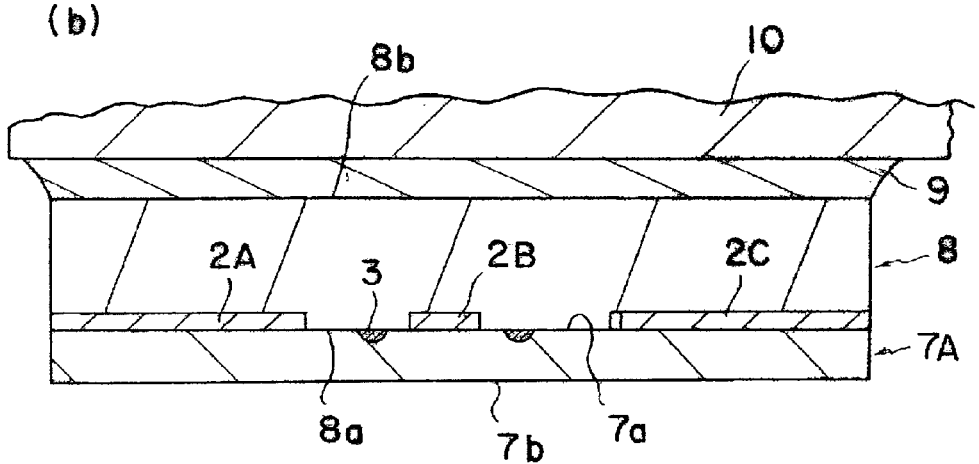

For example as shown in FIG. 8(a), the optical waveguide such as the titanium diffusion optical waveguide 3 and the electrodes 2A, 2B and 2C are formed by electrolytic plating on the first main face 7a of the bulk 7 for the optical waveguide substrate. The first main face 7a of the bulk 7 is adhered to a polishing surface plate 10 through a dummy plate 8. The first main face 7a of the bulk 7 is joined with the one main face 8a of the dummy plate 8 and the other main face 8b of the dummy plate 8 is joined with the surface plate 10 through a joining layer 9. The bulk 7 is subjected to horizontal grinding and polishing (CMP) to reduce the thickness to a predetermined value such as 15 $\mu$m (TLN forming) to obtain a main body 7A as shown in FIG. 8(b). The main body 7A is subjected to dicing to obtain the main body 4 with the recess 4e formed as shown in FIG. 1. The main body 4 is fixed onto the supporting substrate 6 with an adhering agent to obtain a joined body. The joined body is polished at the end faces for receiving optical fibers and then cut by dicing to obtain optical modulation chips. The optical axis of each optical modulation chip is adjusted with that of each optical fiber, and the chip and fiber are then joined with an ultraviolet light curable resin.

For producing the devices shown in FIGS. 5 and 7, a sheet made of a joining agent is interposed between the back face of the main body 4 and the supporting substrate to join them. Preferably, a sheet made of an adhesive of a thermosetting resin, photoresist resin or light thickening resin is interposed between the back face of the main body 4 and the supporting substrate and then cured. Such sheet may preferably be a film made of a resin having a thickness of not larger than 300 $\mu$m, including "T-2000" (supplied by Hitachi Chemical Co. Ltd.), "CARBODILITE FILM" (supplied by Nisshinbo Industries Inc.) and "A-1400", "A-1500" and "A-1600" (supplied by Nagase Chemtech).

Particularly, as shown in FIGS. 5, 6 and 7, a plate-shaped supporting substrate 26 may be adhered with the supporting substrate 4 by a sheet of a resin adhesive. In this case, it is not necessary to form a recess in the supporting substrate 26, further improving the productivity.

EXAMPLES

Figure 9:
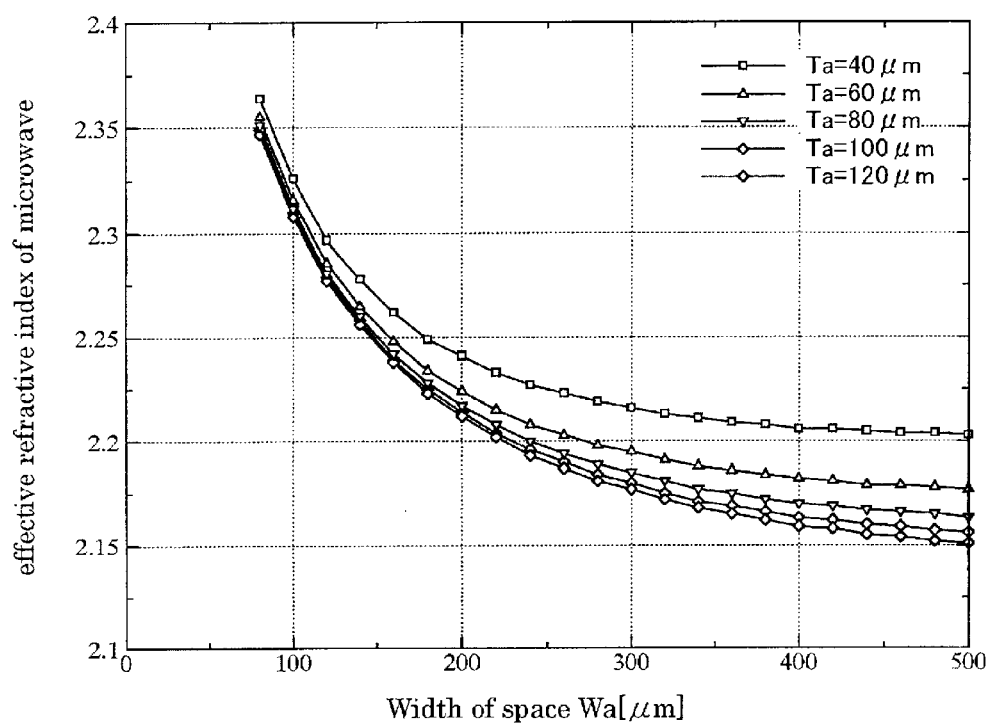
FIG. 9 is a graph showing relationship between the dimensions according to a design for an optical modulator of the invention and the results of calculation of the effective refractive index for microwave.

FIG. 9 shows a design example of a travelling-wave optical modulator of ACPS type shown in FIG. 3. The main body 10B is made of an X-cut plate of lithium niobate single crystal, the optical waveguide is formed by titanium diffusion process, and the electrodes are formed by electroplating process. The supporting substrate 6 is made of an X-cut plate of lithium niobate. The thickness "tw" (the maximum thickness "tmax") of the main body 10B is designed to be 10 $\mu$m, the gap "G" of the electrodes 15 $\mu$m and the width "w" of the electrode 30 $\mu$m. The low dielectric including only air. In this device design, the width "Wa" and height (depth) "Ta" of the space 11 are changed as shown in FIG. 7, also showing the change of the effective refractive index of microwave. As seen from FIG. 7, the effective refractive index of the microwave may be substantially reduced by increasing the width "Wa" to a value not smaller than 100 $\mu$m or to increase the height "Wa" to a value not smaller than 50 $\mu$m. Generally, as the width and depth of the space 11 are larger, the effective refractive index of microwave may be further reduced.

Manufacturing examples will be further described.

Manufacturing Example 1

As shown in FIGS. 8(a) and 8(b), the optical modulator 1A of FIG. 1 was produced. For example, an X-cut 3 inch wafer (made of LiNbO$_3$) was used as a substrate. An optical waveguide 3 of Mach-Zehnder type was formed in the surface area of the wafer by titanium diffusion and photolithography. The size of the optical waveguide 3 was, for example, 10 $\mu$m at 1/e$^2$. CPW electrodes were formed by electroplating.

A resist film was coated onto the first main face (surface) 7a of the wafer-shaped bulk 7 for the main body and the bulk 7 was set on the surface plate 10 of a micro grinder working system through the dummy plate 8. The working position was adjusted referring to the orientation flat plane of the bulk 7. The bulk 7 may be fixed using a thermosetting resin stick wax (manufactured by Nikka Seiko Co., Ltd.). The grinding stone may be a diamond grinding stone for a resin bond with a roughness of a number # 6000. The second main face (back face) of the substrate was worked under a rotating rate of 30,000 rpm and a feed rate of 0.3 mm/second.

Another plate made of lithium niobate was ground as described above to form a recess 6c. The main body 4 and supporting substrate 6 were then joined with an epoxy resin. The recess was not filled with the resin during the joining process. The wafer was then removed from the surface plate and washed with an organic solvent to remove the stick wax thereon. The wafer was then cut with a dicing saw working machine to obtain optical modulator chips 1A. Each chip is optically polished at the end faces of the optical waveguide.

A single core fiber array supporting a 1.5 $\mu$m single mode optical fiber is produced and connected with the travelling wave optical modulator chip 1A. The optical axis of the fiber is adjusted with that of the optical waveguide and joined with an ultraviolet light curable resin adhesive.

Manufacturing Example 2

The optical modulator 1E of FIG. 5 was produced. For example, an X-cut 3 inch wafer (made of LiNbO$_3$) was used as a substrate. An optical waveguide 3 of Mach-Zehnder type was formed in the surface area by titanium diffusion and photolithography. The size of the optical waveguide 3 was, for example, 10 $\mu$m at 1/e$^2$. CPW electrodes were formed by electroplating.

A resist film was coated onto the first main face (surface) 7a of the wafer-shaped bulk 7 (refer to FIG. 8) for the main body and the bulk 7 was set on a the surface plate 10 of a micro grinder working system through the dummy plate 8. The working position was adjusted referring to the orientation flat plane of the bulk 7. The bulk 7 was fixed using a thermosetting resin stick wax (manufactured by Nikka Seiko Co. Ltd.). The grinding stone may be a diamond grinding stone for a resin bond with a roughness of a number #6000. The second main face (back face) of the substrate was worked under a rotating rate of 30,000 rpm and a feed rate of 0.3 mm/second.

The supporting substrate 26 made of lithium niobate was prepared. A sheet of an epoxy thermal setting resin having a thickness of 60 $\mu$m was interposed between the main body 4 and substrate 26. The sheet was then subjected to thermal curing by heating at 80 ° C. to form the joining layer 25 and join the main body 4 and substrate 26. During the joining process, the resin is prevented from flowing inside of the joining layer. The width "Wa" of the space was about 300 µm. The wafer was then removed from the surface plate and washed with an organic solvent to remove the stick wax thereon. The wafer was then cut with a dicing saw working machine to obtaining optical modulator chips 1D. Each chip was optically polished at the end faces of the optical waveguide.

A single core fiber array supporting a 1.5 µm single mode optical fiber is produced and connected with the travelling wave optical modulator chip 1D. The optical axis of the fiber is adjusted with that of the optical waveguide and joined with an ultraviolet light curable resin adhesive. The transmission property S21 was measured using a vector network analyzer to obtain an excellent property, that is, a refractive index of microwave of 2.15.

As described above, the invention may provide an optical waveguide device having an optical waveguide substrate with a mechanical strength sufficient for handling, being effective for reducing off-specification products due to warping, cracks and fracture in the substrate, and effective for improving the propagating velocity of signal wave applied onto its electrode.

What is claimed is:

1. An optical waveguide device comprising an optical waveguide substrate and a supporting substrate supporting said optical waveguide substrate;
wherein said optical waveguide substrate comprises a main body made of an electro-optic material and having a first main face and a second main face, an optical waveguide formed in or on said main body and an electrode formed on the side of said first main face of said main body, and said supporting substrate is joined with said second main face of said main body, a low dielectric portion with a dielectric constant lower than that of said electro-optic material being formed in said supporting substrate.

2. The device of claim 1, wherein at least a part of said low dielectric portion is a space.

3. The device of claim 1, wherein at least a part of said low dielectric portion is composed of a material having a dielectric constant lower than that of said electro-optic material.

4. The device of claim 1, wherein said second main face comprises a region corresponding with said optical waveguide, said region facing said low dielectric portion.

5. The device of claim 1, wherein said main body has a thickness of not larger than 100 µm at a region where said optical waveguide is provided.

6. The device of claim 1, wherein said low dielectric portion has a total thickness of not smaller than 1 µm at a region where said optical waveguide is provided.

7. The device of claim 1, wherein a recess is formed in said optical waveguide substrate at said second main face.

8. The device of claim 7, wherein said main body has a first thinner portion facing said recess and a second thinner portion facing said recess, said second thinner portion has a thickness smaller than that of said first thinner portion, and said optical waveguide being provided in or on said first thinner portion.

9. The device of claim 1, wherein a plurality of said low dielectric portions are provided, each low dielectric portion extending in a direction of propagation of light through said waveguide.

10. The device of claim 1, comprising a joining layer for joining said supporting substrate and said second main face of said main body, and an additional low dielectric portion with a dielectric constant lower than that of said electro-optic material, said additional low dielectric portion being provided inside of said joining layer and being provided between said main body and said supporting substrate.

11. An optical waveguide device comprising an optical waveguide substrate and a supporting substrate supporting said optical waveguide substrate;
wherein said optical waveguide substrate comprises a main body made of an electro-optic material and having a first main face and a second main face, an optical waveguide formed in or on said main body and an electrode formed on the side of said first main face of said main body, said device comprising a joining layer joining said supporting substrate and said second main face of said, a low dielectric portion with a dielectric constant smaller than that of said electro-optic material being provided inside of said joining layer, and said low dielectric portion being provided between said main body and said supporting substrate.

12. The device of claim 11, wherein at least a part of said low dielectric portion is a space.

13. The device of claim 11, wherein at least a part of said low dielectric portion is composed of a material having a dielectric constant smaller than that of said electro-optic material.

14. The device of claim 11, wherein said second main face comprises a region corresponding with said optical waveguide, said region facing said low dielectric portion.

15. The device of claim 11, wherein said joining layer has a thickness of not smaller than 5 µm.

16. The device of claim 11, wherein said joining layer is made of a sheet made of a resin adhesive.

17. The device of claim 11, wherein said main body has a thickness of not larger than 100 µm at a region where said optical waveguide is provided.

18. The device of claim 11, wherein said low dielectric portion has a total thickness of not smaller than 1 µm at a region where said optical waveguide is provided.

19. The device of claim 11, wherein a recess is formed in said optical waveguide substrate at said second main face.

20. The device of claim 19, wherein said main body has a first thinner portion facing said recess and a second thinner portion facing said recess, said second thinner portion has a thickness smaller than that of said first thinner portion, and said optical waveguide being provided in or on said first thinner portion.

21. The device of claim 11, wherein a plurality of said low dielectric portions are provided, each low dielectric portion extending in a direction of propagation of light through said waveguide.

22. A travelling-wave optical modulator comprising said device of claim 1, wherein said electrode applies a voltage on said optical waveguide to modulate light propagating in said optical waveguide.

23. The optical modulator of claim 22, comprising a plurality of modulating units, each modulating unit comprising said electrode and said optical waveguide, and said electrode applying a voltage on said optical waveguide in each of said modulating units for modulating light propagating in said waveguide independently.

24. A method of producing an optical waveguide device comprising an optical waveguide substrate and a supporting substrate for supporting said optical waveguide substrate, said optical waveguide substrate comprising a main body made of an electro-optic material and a first and second main faces, an optical waveguide formed in or on said main body and an electrode formed on the side of said first main face of said main body: said method comprising the steps of;

forming a low dielectric portion having a dielectric constant lower than that of said electro-optic material in said supporting substrate, and joining said supporting substrate with said second main face of said main body.

25. The method of claim 24, wherein said supporting substrate is joined with said second main face of said main body by means of a joining layer, wherein an additional low dielectric portion having a dielectric constant lower than that of said electro-optic material is formed between said main face and said supporting substrate and inside of said joining layer.

26. A method of producing an optical waveguide device comprising an optical waveguide substrate and a supporting substrate for supporting said optical waveguide substrate, said optical waveguide substrate comprising a main body made of an electro-optic material and a first and second main faces, an optical waveguide formed in or on said main body and an electrode formed on the side of said first main face of said main body: said method comprising the step of;

forming a joining layer to join said supporting substrate with said second main face of said main body, wherein a low dielectric portion having a dielectric constant lower than that of said electro-optic material is formed between said main face and said supporting substrate and inside of said joining layer.

27. The method of claim 26, wherein said joining layer is composed of a sheet of a resin adhesive.

28. A traveling-wave optical modulator comprising said device of claim 11, wherein said electrode applies a voltage on said optical waveguide to modulate light propagating in said optical waveguide.

* * * * *

UNITED STATES PATENT AND TRADEMARK OFFICE
CERTIFICATE OF CORRECTION

PATENT NO.     : 6,819,851 B2
DATED          : November 16, 2004
INVENTOR(S)    : Kenji Aoki, Jungo Kondo, Atsuo Kondo and Osamu Mitomi It is certified that error appears in the above-identified patent and that said Letters Patent is hereby corrected as shown below:

Column 9,
Line 11, change "ay" to -- may --
Line 18, add -- not larger -- after "preferably"

Column 14,
Line 15, add -- main body -- after "said"

Signed and Sealed this

First Day of March, 2005

JON W. DUDAS
*Director of the United States Patent and Trademark Office*